United States Patent
Meschke

(10) Patent No.: US 10,051,791 B2
(45) Date of Patent: Aug. 21, 2018

(54) HARVESTER CLEANING SHOE LOUVER

(71) Applicant: Deere and Company, Moline, IL (US)

(72) Inventor: Michael T. Meschke, Silvis, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 15/293,924

(22) Filed: Oct. 14, 2016

(65) Prior Publication Data

US 2018/0103589 A1    Apr. 19, 2018

(51) Int. Cl.
*A01F 12/44* (2006.01)

(52) U.S. Cl.
CPC .......... *A01F 12/446* (2013.01); *A01F 12/444* (2013.01)

(58) Field of Classification Search
CPC .... A01F 12/446; A01F 12/448; A01F 12/444; B07B 1/12
USPC ............... 209/393, 394; 460/100, 101, 99
See application file for complete search history.

(56) References Cited

U.S. PATENT DOCUMENTS

| | | | | |
|---|---|---|---|---|
| 694,496 A | * | 3/1902 | Rumely | A01F 12/446 209/394 |
| 1,956,507 A | * | 4/1934 | Johnson | A01F 12/448 209/394 |
| 2,011,365 A | * | 8/1935 | Kuballe | B07B 1/46 209/393 |
| 2,105,986 A | * | 1/1938 | Petersen | A01F 12/446 209/394 |
| 2,335,416 A | * | 11/1943 | Holtzman | A01F 12/448 209/394 |
| 2,428,294 A | * | 9/1947 | Ross | A01F 12/446 209/394 |
| 2,554,416 A | * | 5/1951 | Morrissey | A01F 12/44 209/26 |
| 2,883,052 A | * | 4/1959 | Shovlain | B07B 13/003 209/394 |
| 3,043,427 A | | 7/1962 | Eisert | |
| 5,085,616 A | * | 2/1992 | Matousek | A01F 12/44 209/394 |
| 6,053,812 A | * | 4/2000 | Loewen | A01F 12/446 460/101 |
| 7,896,731 B2 | * | 3/2011 | Schwinn | A01F 12/446 460/101 |
| 9,258,945 B2 | | 2/2016 | Pearson et al. | |
| 2003/0140612 A1 | | 7/2003 | Gorden | |

FOREIGN PATENT DOCUMENTS

| | | |
|---|---|---|
| DE | 1006651 | 4/1957 |
| EP | 0678238 | 10/1995 |
| FR | 1180659 | 6/1959 |
| FR | 2549345 | 1/1985 |
| FR | 2823638 | 10/2002 |
| RU | 2041597 | 8/1995 |
| RU | 2439872 | 1/2012 |
| SU | 1464957 | 3/1989 |

OTHER PUBLICATIONS

European Search Report for Application 17196325.9 dated Feb. 26, 2018.

* cited by examiner

*Primary Examiner* — Robert E Pezzuto
(74) *Attorney, Agent, or Firm* — Rathe Lindenbaum LLP

(57) ABSTRACT

A harvester cleaning shoe louver includes a head portion about which the louver is to pivot, a tail blade extending from the head portion and fin blades. The fin blades extend from a rear face of the tail blade at spaced locations along the tail blade.

19 Claims, 5 Drawing Sheets

HARVESTER CLEANING SHOE LOUVER

BACKGROUND

Harvesters are used to gather a crop. Many harvesters utilize a sieve or cleaning shoe to separate grain or other wanted portions of a crop from chaff or other unwanted portions of the crop. The sieve or cleaning shoe may include louvers which are actuated to different positions to vary the crop filtering function carried out by the sieve. Such actuation may be carried out by rotating a louver wire connected to each of the louvers.

DETAILED DESCRIPTION OF EXAMPLES

Figure 1:
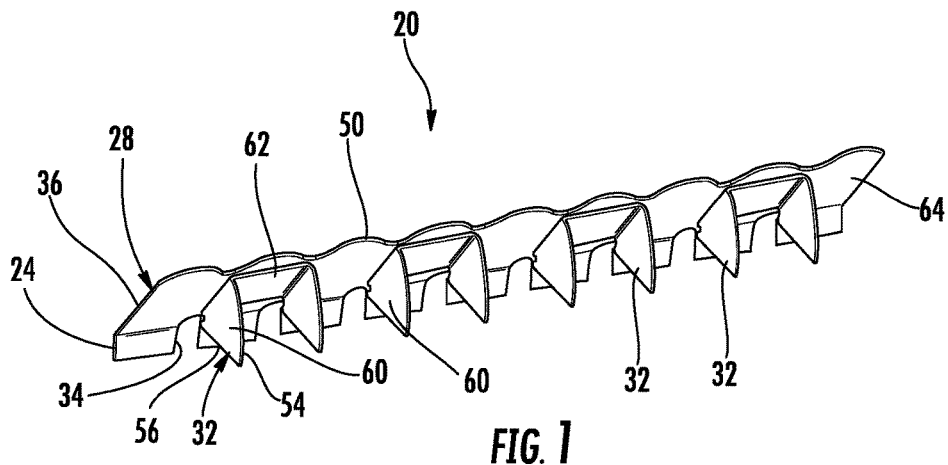
FIG. 1 is a rear perspective view of an example harvester cleaning shoe louver.

The cleaning shoe of a harvester utilizes louvers to separate or filter out grain from remaining portions of the crop material such as straw and chaff. To do so, the crop material is deposited on the louvers while air is blown in a rearward direction through the louvers. The grain, which is heavier than the straw and chaff, falls through and between the louvers to a receiver where it is gathered and ultimately conveyed to a grain tank. The straw and chaff are lifted and blown further rearward by the air for discharge at the rear of the harvester.

Laminar airflow through the louvers facilitates more efficient grain cleaning, more efficient separation of the straw and chaff from the grain. Many existing cleaning shoes and harvester cleaning systems experience turbulent airflow rather than laminar airflow. Straw and chaff becoming caught by the louvers or on the louvers may partially block the spacing between the louvers. Such blockages may further reduce cleaning efficiency by reducing airflow through the louvers and by creating even more turbulent airflow.

Disclosed herein are examples of a harvester cleaning shoe louver, a harvester cleaning system and a harvester cleaning method that facilitate more laminar airflow through and across the louvers and that reduce airflow blockages resulting from chaff and straw becoming caught on the louvers. As a result, cleaning efficiency may be enhanced.

Disclosed herein is one example of a harvester cleaning shoe louver that includes a head portion about which the louver is to pivot, a tail blade extending from the head portion, and fin blades. The fin blades extend from a rear face of the tail blade at spaced locations along the tail blade.

Disclosed herein is one example of a harvester cleaning system that comprises transversely spaced supports and a louver extending between and pivotable about an axis relative to the transversely spaced supports. The louver comprises a head portion about which the louver is to pivot, a tail blade extending from the head portion and fin blades. The tail blade has a front face and a rear face. The fin blades extend from the rear face at spaced locations along the tail blade.

Disclosed herein is one example of a harvester cleaning method which may include pivoting a plurality of louvers about parallel axes from a first orientation to a second orientation, wherein each of the plurality of louvers comprises a head portion about which the louver is to pivot, a tail blade extending from the head portion; the tail blade having a front face and a rear face and fin blades extending from the rear face at spaced locations along the tail blade. The method further comprises depositing crop material on the plurality of louvers and blowing air between the plurality of louvers, between the fin blades of each of the louvers to separate heavier portions of the crop material from lighter portions of the crop material. The heavier portions of the crop material fall between the plurality of louvers while the lighter portions of the crop material are carried away by the blown air.

Figure 2:
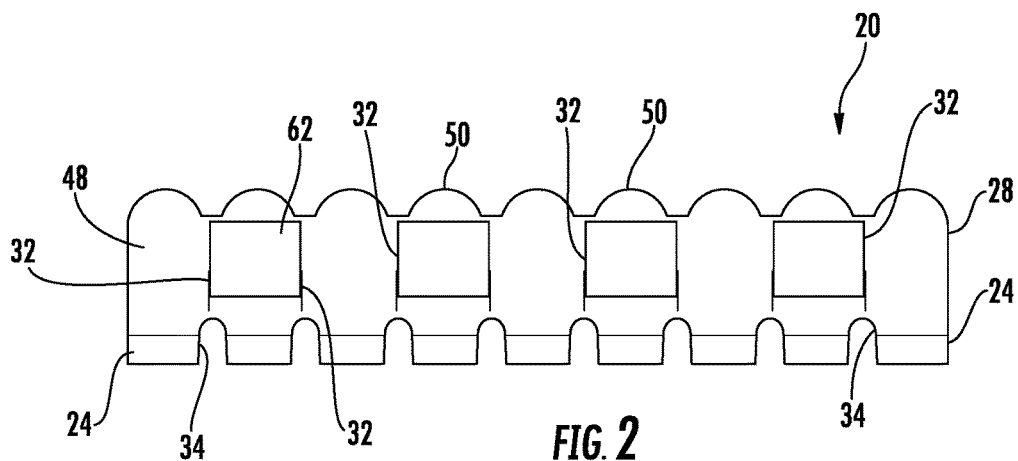
FIG. 2 is a rear view of the example harvester cleaning shoe louver of FIG. 1.

FIGS. 1-2 illustrate an example harvester cleaning shoe louver 20. Louver 20 facilitates more laminar airflow through and across a harvester cleaning shoe and reduces airflow blockages resulting from chaff and straw becoming caught on the louver. As a result, cleaning efficiency may be enhanced. Louver 20 comprises head portion 24, tail blade 28, fin blades 32 and slots 34.

Head portion 24 comprises a portion of louver 20 about which louver 20 is to pivot. Head portion 24 provides surfaces to which a louver wire may be mounted. Although illustrated as a substantially flat panel, head portion 24 may have other configurations. For example, in other implementations head portion 24 may be curled or rounded so as to form a channel about a louver wire or to receive a louver wire. In some implementations, head portion 24 may be co-planar with tail blade 28.

Tail blade 28 extends rearwardly from head portion 24. Tail blade 28 comprises a panel having a front face 36 and a rear face 48. Front face 36 extends rearwardly at an upwardly inclined angle of between 0 and 60 degrees with respect to head portion 24. Front face 36 directs air being blown in an rearward, upwardly angled direction so as to lift and rearwardly convey straw, chaff and other lighter crop material above louver 20 and towards the rear of the cleaning shoe in which louver 20 is employed.

In one implementation, tail blade 28 is a flat imperforate panel extending in a plane parallel to the axis along which the louver wire to be mounted to louver 20 will extend. In the example illustrated, tail blade 28 comprises a plate having a uniform thickness and extending at a rearward angle with respect to head portion 24. In other implementations, tail blade 28 may have more of a three-dimensional shape having a non-uniform thickness. In some implementations, blade 28 may be perforated.

In the example illustrated, tail blade 28 has a series of convex rear edges 50. Such convex edges further direct airflow rearwardly and resist snagging of straw and chaff. The convex edges further assist in penetrating the crop mat. In the example illustrated, edges 50 are rounded, having smooth surfaces that further inhibit the snagging of crop material. In other implementations, tail blade 28 may comprise rear edges having other shapes. In some implementations, tail blade 20 may have a single straight rear edge.

Fin blades 32 comprise blades projecting rearwardly from tail blade 28 at spaced locations along tail blade 28. In one implementation, fin blades 32 are transversely spaced from one another by center-to-center distance of at least 25 mm and no greater than 55 mm. Fin blades 32 extend a direction away from the direction in which front face 36 faces. Fin blades 32 each have a rear convex edge 54 and a lower edge 56.

Edge 54 faces in a direction away from the direction in which front face 36 faces. Because edge 54 is convex, crop material, such as chaff and straws is likely to snag and collect on edge 54. In the example illustrated, edge 54 is rounded or curved further lessening the likelihood of crop material snagging or collecting on edge 54. In one implementation, each of fin blades 32 has a radius of between 20 mm and 50 mm. In one implementation, each of fin blades 32 has a circumferential length of at least 10 mm and less than or equal to 80 mm. In other implementations, edge 54 may have other convex shapes, such as having a polygonal shape, and may have other lengths.

Lower edge 56 extends from convex edge 54 towards head portion 24 and tail blade 28. In the example illustrated, an entirety of lower edge 56 extends below tail blade 28 and below the reach of or end of slots 34. As a result, the side faces 60 of fin blades 32, the major surface dimension of fin blades 32, are larger, providing greater flow conditioning to facilitate laminar airflow. In one implementation, each of the side faces 60 have a surface area of at least 100 mm$^2$. Due to their extent, edges 56 are sufficiently low, facing in a downward direction, so as to be less likely to snag crop material.

In one implementation, each of fin blades 32 is a planar flat, pie-shaped panel. In other implementations each of fin blades 32 may have other three-dimensional shapes. In one implementation, fin blades 32 are formed from at least one stamped sheet of sheet-metal. In one implementation, pairs of fin blades 32 are formed from a stamped sheet of sheet-metal bent on opposite ends to form a pair of opposing fin blades 32 with an intermediate band 62 that is joined to a rear face 64 of tail blade 28. Such joining may be by welding, brazing, adhesives or fasteners, such as rivets. In other implementations, fin blades 32 may be formed from other materials and may be provided in other fashions. For example, as will be described below, fin blades 32 may alternatively be molded or otherwise formed out of a polymer or plastic material.

Slots 34 comprise openings extending from a lower edge of head portion 24. In the example illustrated, slots 34 extend up into tail blade 28. Slots 34 receive fin blades 32 of a consecutively supported harvesters cleaning shoe louver 20. As seen in FIG. 2, in the example illustrated, slots 34 are aligned with convex edges 54. As a result, fin blades 32 are aligned with and extending to close proximity with corresponding fin blades 32 of an adjacent louver 20.

Slots 34 facilitate the overlapping of portions of fin blades 32 with respect to consecutively supported harvesters cleaning shoe louvers 20. Slots 34 facilitate closer packing of louvers 20 in a cleaning shoe. As a result, the tips of fin blades 32 at the junction of convex edges 54 and lower edges 56 are less exposed, less likely to snag or collect straw and chaff which might otherwise occlude the spacing between consecutive louvers 20. Slots 34 further facilitate larger fin blades 32, providing greater surface area for conditioning airflow to better provide laminar airflow. In some implementations, slots 34 may be omitted or may be provided at other locations. For example, in other implementations slots 34 may be staggered, located between fin blades 32, wherein the fin blades 32 of consecutive louvers 20 are transversely staggered with respect to one another.

Figure 3:
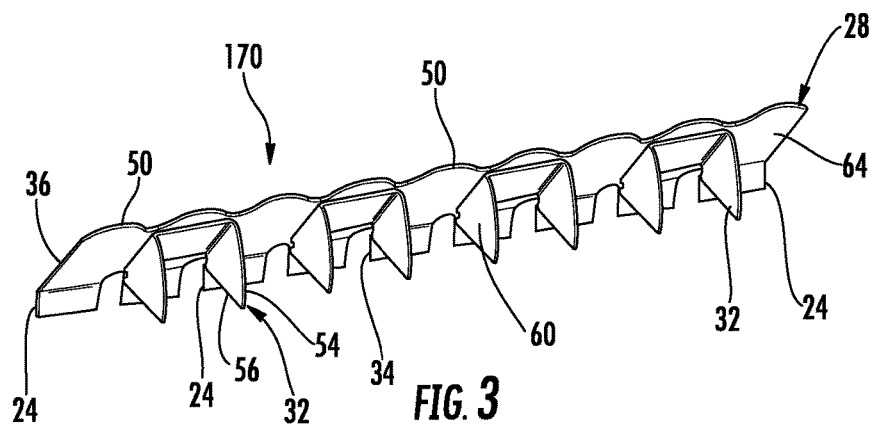
FIG. 3 is a rear perspective view of another example harvester cleaning shoe louver.

FIG. 3 is a rear perspective view of harvester cleaning shoe louver 170, another implementation of louver 20. Louver 170 is similar to louver 20 in all respects except that louver 170 is integrally formed as a single unitary body out of a polymer material. In particular, head portion 24, tail blade 28 and each of fin blades 32 are integrally formed as a single unitary body such as by molding. In one implementation, louver 170 is formed from a polymer such as polyethylene. Those remaining components of louver 170 which correspond to components of louver 20 are numbered similarly.

Figure 4:
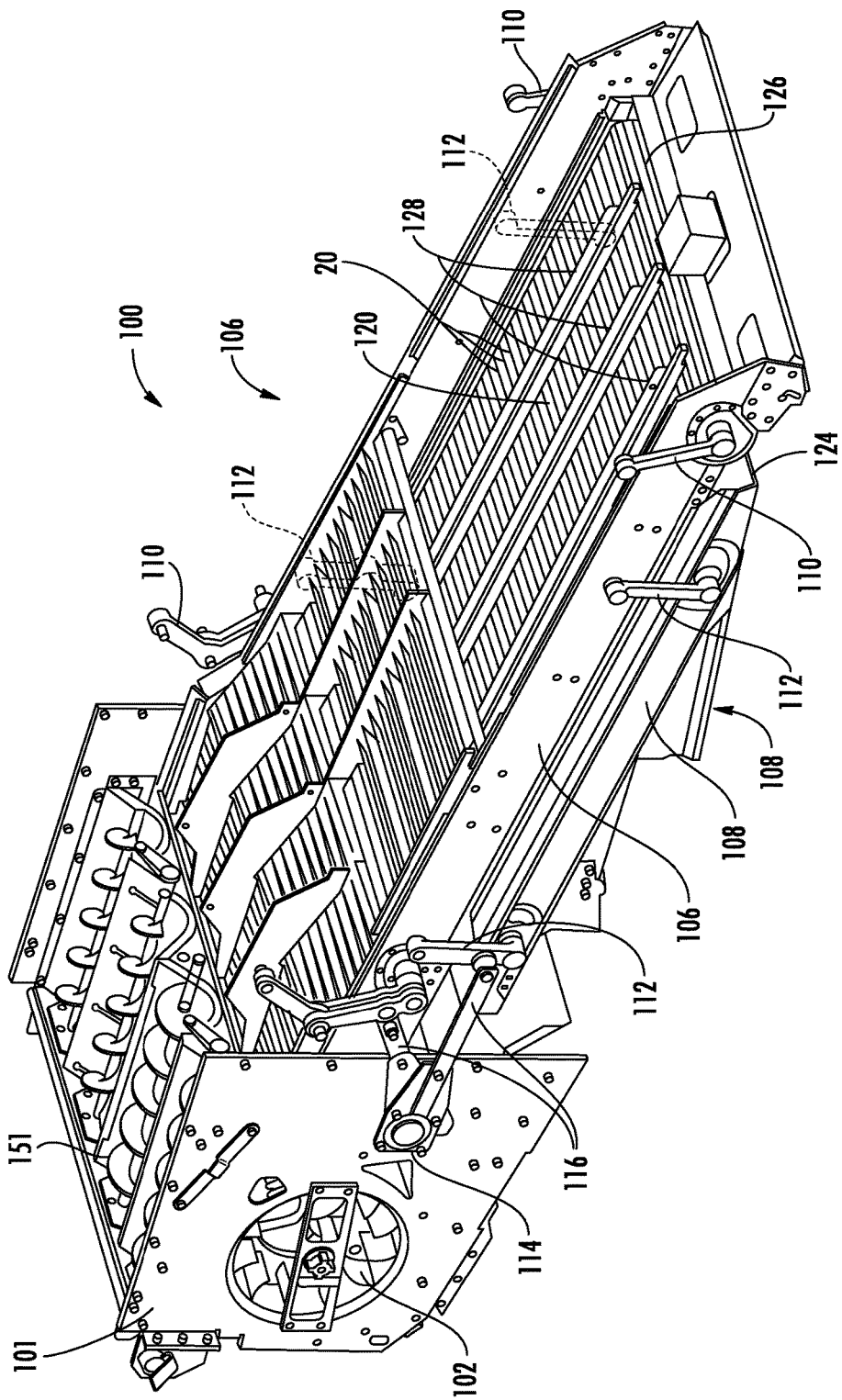
FIG. 4 is a rear perspective view of an example harvester cleaning shoe comprising the example harvester cleaning shoe louvers of FIG. numeral 1.

FIG. 4 is a perspective view of an example harvester cleaning shoe 100 incorporating cleaning shoe louvers 20. Cleaning shoe 100 comprises housing 101, a fan 102, a housing 104, an upper sieve assembly 106, a lower sieve assembly 108, hangers 110, hangers 112, a motor 114, and a drive crank 116. Housing 101 comprise a structure that supports fan 102 and motor 114. Fan 102 extends laterally across substantially the entire width of the cleaning shoe. Fan 102 generates an airflow that travels rearward toward the upper sieve assembly 106 and the lower sieve assembly 108. This air is conveyed upward through the upper sieve assembly 106 and the lower sieve assembly 108, levitating mass other than grain such as straw and chaff and carries the straw and chaff rearward and out of the agricultural harvester.

The upper sieve assembly 106 comprises a frame 118 that is generally rectangular and an upper sieve 120 that is supported in the frame 118. The lower sieve assembly 108 comprises a frame 122 and a lower sieve 124 that is supported in the frame 122. Upper sieve 122 and lower sieve 124 each comprise a rectangular frame 126 and supports 128 supporting a fore-and-aft extending array of laterally extending louvers 20. Each of louvers 20 is pivotally supported by frame 126 and supports 128 to pivot about their respective longitudinal and laterally extending axes.

Each hanger 110 has an upper end and a lower end. The upper end is pivotally coupled to the chassis (not shown) of the agricultural harvester. The lower end is pivotally coupled to the upper sieve assembly 106. By this arrangement, the upper sieve assembly 106 is suspended to pivot generally fore and aft. The hangers 110 are disposed in a generally rectangular arrangement, to support the left front, left rear, right front, and right rear of the upper sieve assembly 106. Thus, the hangers 110 are disposed at and support the upper sieve assembly 106 at the four corners of the upper sieve assembly 106 disposed at and support the upper sieve assembly 106 at the four corners of the upper sieve assembly 106.

Each hanger 112 has an upper end and a lower end. The upper end is pivotally coupled to the chassis (not shown) of the agricultural harvester. The lower end is pivotally coupled to the lower sieve assembly 108. By this arrangement the upper sieve assembly 106 is suspended to pivot generally fore-and-aft. The hangers 112 are disposed in a generally rectangular arrangement to support the left front, left rear, right front, and right rear of the lower sieve assembly. Thus, the hangers 112 are disposed at and support the lower sieve assembly 108 at the four corners of the lower sieve assembly 108.

Figure 5:
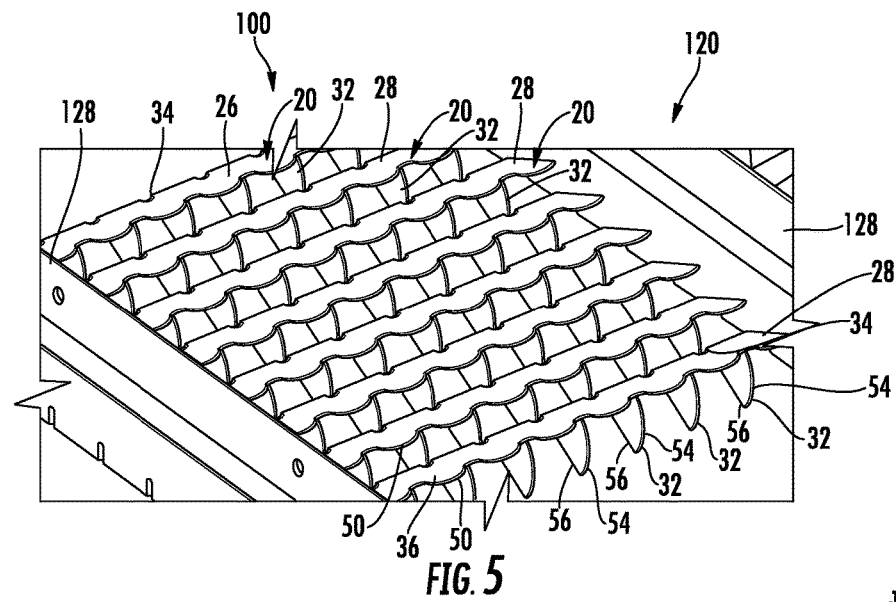
FIG. 5 is a fragmentary rear perspective view of a portion of the cleaning shoe of FIG. 4.
Figure 6:
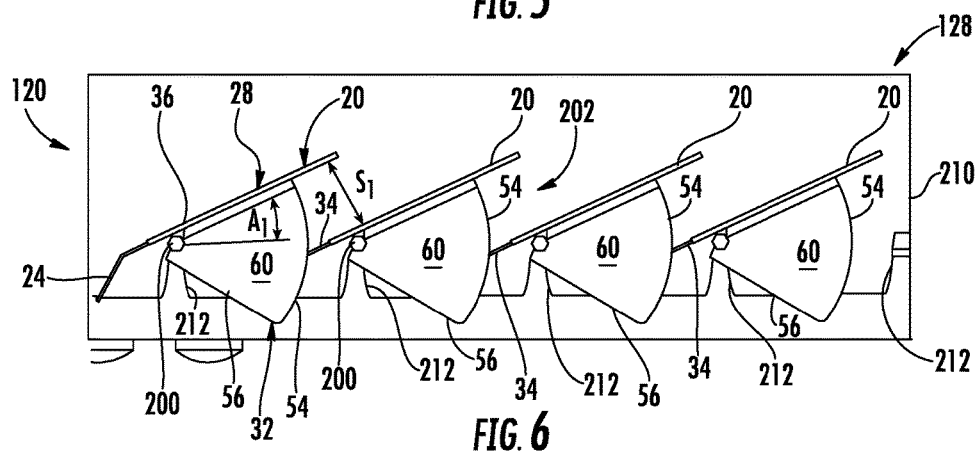
FIG. 6 is a sectional view of the portion of the cleaning shoe louver of FIG. 4.
Figure 7:
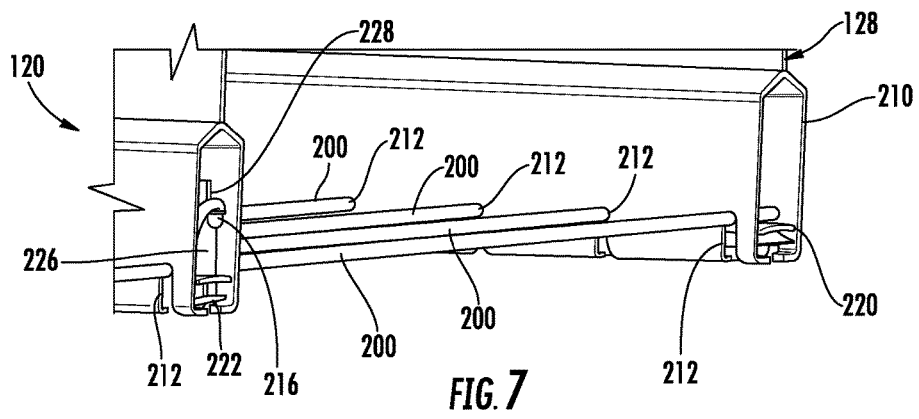
FIG. 7 is a fragmentary perspective view of a portion of the cleaning shoe of FIG. 4, omitting louvers 20 to illustrate louver wires and their supports.

FIGS. 5-7 illustrate portions of upper sieve 120 in more detail. FIG. 5 illustrates the array of louvers 20 supported between supports 128 by louver wires 200 (shown in FIGS. 6 and 7). FIGS. 5 and 6 illustrate the individual louvers 20 supported a first state. In the illustrated example or state, front faces 36 of tail blades 28 extend rearwardly and upwardly at an angle of A1 of 25°. As a result, an opening 202 is formed between consecutive front faces 36 of consecutive louvers 20. In the example illustrated, each opening has a spacing S1 of 28 mm. This spacing may be set by an operator in response to particular field and harvesting conditions.

As further shown by FIGS. 5 and 6, convex edges 54 of each of blades 32 passed through corresponding slots 34 of the adjacent louvers 20. As a result, rear portions of tail blades 28 may vertically overlap the front portions of the tail blades 28 of adjacent louvers 20. Moreover, as the front portion of the tail blades 28 and/or had portions 24 extend around and on both sides of each of blades 32, there is a less likelihood of mass other than grain, such as straw or chaff, becoming caught or snagged on blades 32.

FIG. 7 illustrates example supports 128 and example louver wires 200 in more detail with louvers 20 being omitted for purposes of illustration. In the example illustrated, each support 128 comprises a channel member 210 having multiple slots 212 which rotatably receive louver wires 200. Each louver wire 200 comprises a lever portion 216 which rises up and which is received within the interior of each channel member 210. In the example illustrated, each louver wire 200 and associated lever portion 216 is retained within channel member 210 by an underlying support plate 220, wherein a spring member 222 resiliently urges the support plate 220 against the underside of each of louver wires 200 against the top of each slot 212.

As further shown by FIG. 7, channel member 210 of at least one of supports 128 houses in adjustment arm 226. The adjustment arm comprises a plurality of slots 228 spaced along its length corresponding to the spacing of louver wires 200. Each of slots 228 receives a corresponding one of louver wires 200. To adjust the angular orientation of each of louvers 20 (shown in FIGS. 5 and 6) adjustment arm 228 is linearly driven or moved along and within channel member 210, engaging lever portion 216 and rotating louver wires 200. It should be appreciated that FIG. 7 illustrates just one example of a support 128 and a mechanism (adjustment arm 228) that may be utilized to support louvers 20 as well as selectively adjust the angular orientation of louvers 20. In other implementations, louvers 20 may be supported and may be selectively rotated or angrily adjusted by other mechanisms.

Figure 8:
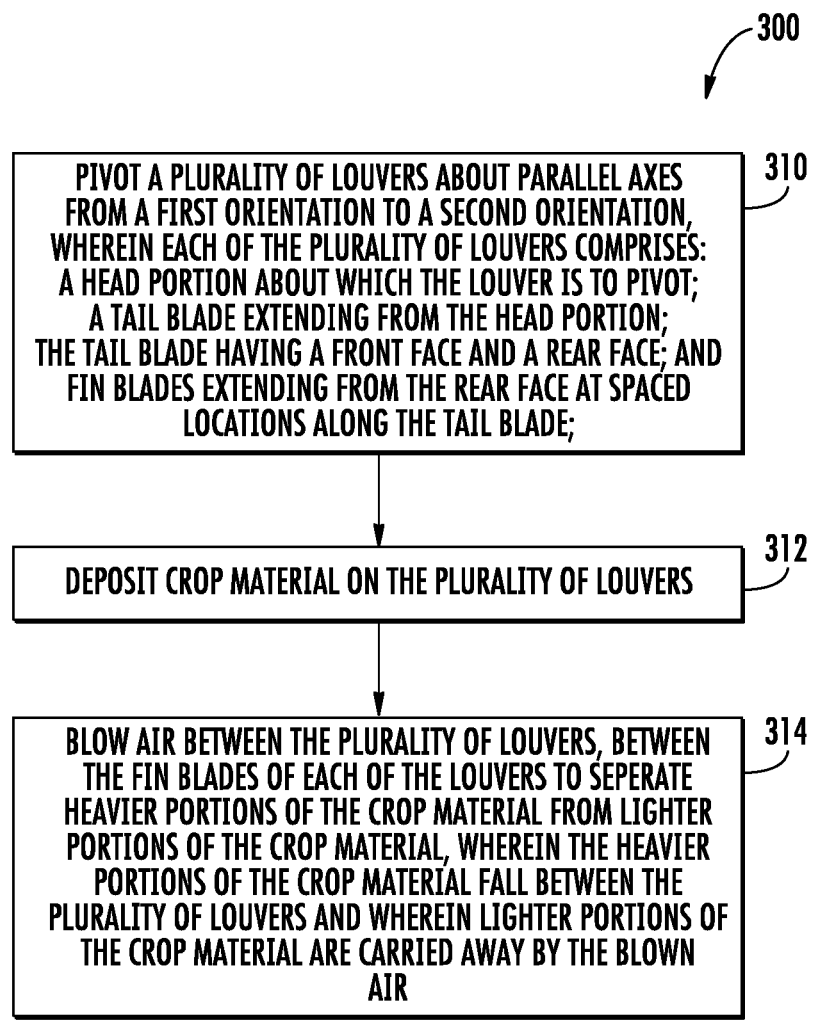
FIG. 8 is a flow diagram of an example harvester cleaning method.

FIG. 8 is a flow diagram of an example harvester cleaning method 300 for cleaning crop material, separating grain from material other than grain such as chaff and straw. Method 300 facilitates more efficient separation of grain from material other than grain by facilitating more laminar airflow through louvers and by reducing the extent to which the mass other than grain snags and collects on such louvers. Although method 300 is described as being carried out using louvers 20 in a cleaning shoe such as cleaning shoe 100 described above, it should be appreciated that method 300 may be carried out using other simile configured louvers, such as louvers 170 described above, in other cleaning shoes or cleaning shoe systems.

Figure 9:
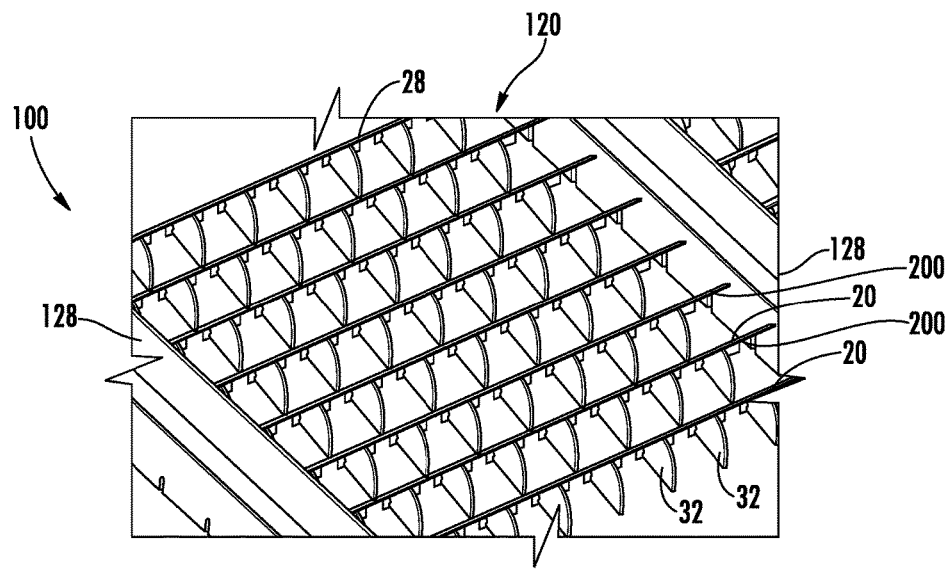
FIG. 9 is a fragmentary perspective view of a portion of the cleaning shoe of FIG. 4 after the example louvers have been pivoted from a first orientation as shown in FIGS. 5 and 6 to a second different orientation.
Figure 10:
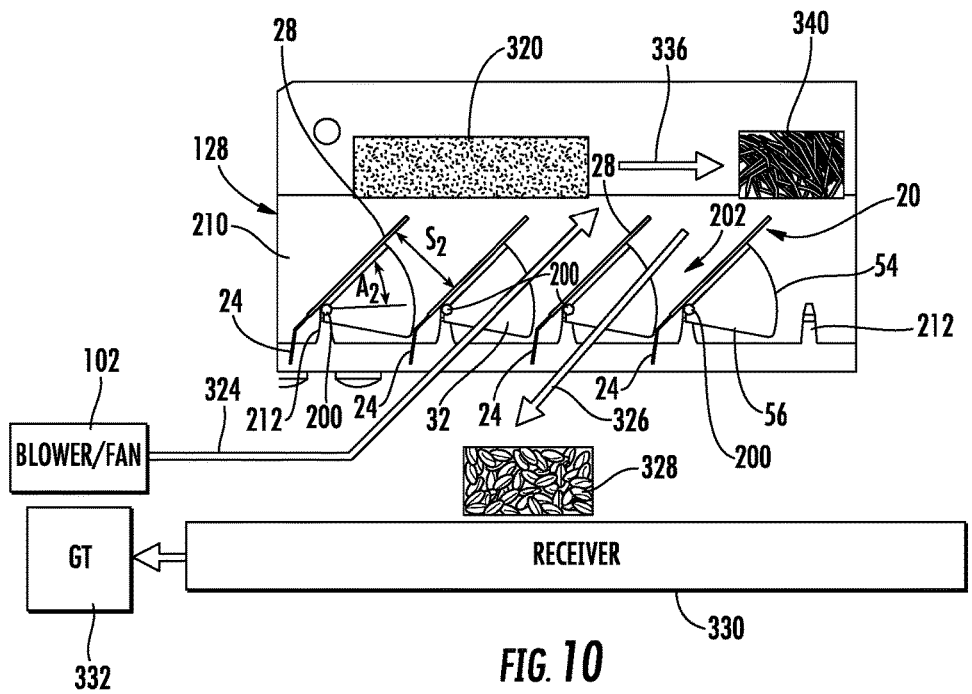
FIG. 10 is a sectional view of the portion of the cleaning shoe of FIG. 9 in the second orientation, further illustrating the separation of grain from material other than grain using the example louvers.

As indicated by block 310 and further illustrated in FIGS. 9 and 10, a plurality of louvers, such as louvers 20, are pivoted about parallel axes. In one implementation, adjustment arm 228 is slidably moved within channel member 210 to move lever portions 216 and thereby rotate each of louver wires 200. Such rotation of louver wire 200 correspondingly rotates louvers 20. As described above, each of louvers 20 has a head portion 24 about which the louvers to pivot, the tail blades 28 extending from the head portion and having a front face and a rear face. Each louver 20 further comprises a fin blades 32 extending from the rear face 64 at spaced locations along the tail blade 28.

In the example illustrated, louvers 20 are pivoted a first orientation shown in FIGS. 5 and 6 to a second orientation shown in FIGS. 9 and 10. As described above, in the first orientation shown in FIGS. 5 and 6, front faces 36 of tail blades 28 extend rearwardly and upwardly at an angle of A1 of 25°. As a result, an opening 202 is formed between consecutive front faces 36 of consecutive louvers 20. In the example illustrated, each opening has a spacing S1 of 28 mm. This spacing may be set by an operator in response to particular field and harvesting conditions.

In the second orientation shown in FIGS. 9 and 10, front faces 36 of tail blades 28 extend rearwardly and upwardly at an angle of A2 of 45°. As a result, the opening 202 formed between consecutive front faces 36 of consecutive louvers 20 has an adjusted spacing S2 of 28 mm. as should be appreciated, the exact angle of faces 36 and the exact spacings S1 and S2 may vary and are operator adjustable based upon the extent that louver wires 200 are rotated.

As indicated by block 312 and schematically shown in FIG. 10, crop material 320 is deposited on the plurality of louvers 20. Such material may fall from an u a chaffer or from an additional overlying sieve of the cleaning shoe, such as cleaning shoe 100. The deposited crop material may include both grain and material other than grain, such as chaff or straw.

As indicated by block 314 and further shown in 10, air three and 24 is blown by a blower or fan, such as fan 102 rearwardly and upwardly through and between the plurality louvers 20, between the fin blades 32 of each of the louvers 20. Fin blades 32 condition airflow to facilitate more laminar airflow (in contrast to turbulent airflow). As indicated by arrow 326, grain 328, being heavier than chaffer straw, falls through the spacings 202 between louvers 20. The grain 328 is deposited upon a receiver 330, such as an auger or other conveyance mechanism, that conveys or otherwise transports the grain 328 to a grain tank 332 (schematically illustrated). As indicated by arrow 336, the lighter portions of the crop material, such as chaffer straw 340 (schematically illustrated) are elevated and carried away rearwardly for discharge from the harvester by the blown air 324.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements.

What is claimed is:

1. A harvester cleaning shoe louver comprising:
a head portion extending along an axis about which the louver is to pivot;
a tail blade extending from the head portion; the tail blade having a front face and a rear face;
fin blades extending from the rear face at spaced locations along the tail blade, wherein each of the fin blades has opposite fin blade faces extending in respective planes that intersect the axis.

2. The harvester cleaning shoe louver of claim 1 further comprising slots extending into at least one of the head portion and the tail blade to receive fin blades of a consecutively supported harvester cleaning shoe louver.

3. The harvester cleaning shoe louver of claim 1, wherein each of the fin blades has a convex edge facing away from the rear face of the tail blade.

4. The harvester cleaning shoe louver of claim 3, wherein each of the fin blades has a lower edge extending between the head portion and the convex edge.

5. The harvester cleaning shoe louver of claim 4, wherein an entirety of lower edge extends below the head portion.

6. The harvester cleaning shoe louver of claim 3, wherein the convex edge has a radius of between 25 mm and 60 mm.

7. The harvester cleaning shoe louver of claim 3, wherein each of the fin blades has a face having a surface area of at least 100 mm$^2$.

8. The harvester cleaning shoe louver of claim 1, wherein each of the fin blades extend perpendicular to the tail blade.

9. The harvester cleaning shoe louver of claim 1, wherein the head portion, the tail blade and the fin blades are integrally formed as a single unitary body from a polymer.

10. The harvester cleaning shoe louver of claim 1 comprising a sheet having an intermediate band and a pair of bent ends extending from opposite portions of the intermediate band to form a pair of the fin blades, wherein the intermediate band has a face parallel to the rear face of the tail blade and joined to the rear face of the tail blade.

11. A harvester cleaning system comprising:
transversely spaced supports;
a louver extending between and pivotable about an axis relative to the transversely spaced supports, the louver comprising:
a head portion about which the louver is to pivot;
a tail blade extending from the head portion; the tail blade having a front face and a rear face; and
fin blades extending from the rear face at spaced locations along the tail blade;
a second louver extending between and pivotable about a second axis relative to the transversely spaced supports the second louver comprising:
a second head portion about which the second louver is to pivot;
a second tail blade extending from the head portion; the tail blade having a front face and a rear face;
second fin blades extending from the rear face at spaced locations along the second tail blade, wherein the second fin blades are transversely staggered with respect to the fin blades; and
slots through at least one of the second head portion and the second tail blade through which the fin blades pass during pivoting of the louver.

12. The harvester cleaning system of claim 11 further comprising a louver wire extending along the axis perpendicularly between the transversely spaced supports, the louver wire being connected to the head portion of the louver, louver wire to be selectively pivotable to pivot the louver about the axis.

13. The harvester cleaning system of claim 11, wherein each of the fin blades has a first convex edge facing away from the rear face of the tail blade and wherein each of the second fin blades has a second convex edge facing away from the rear face of the second tail blade.

14. The harvester cleaning system of claim 13, wherein each of the fin blades and the second fin blades has a first lower edge extending between the head portion and the convex edge, wherein an entirety of the lower edge extends below the head portion.

15. The harvester cleaning system of claim 13, wherein the convex edge and the second convex edge each have a radius of between 25 mm and 60 mm.

16. The harvester cleaning system of claim 13, wherein each of the fin blades and the second fin blades has a face having a surface area of at least 100 mm$^2$.

17. The harvester cleaning system of claim 13, wherein each of the fin blades extend perpendicular to the tail blade and wherein each of the second fin blades extend perpendicular to the second tail blade.

18. A method comprising:
pivoting a plurality of louvers about parallel axes from a first orientation to a second orientation, wherein each of the plurality of louvers comprises:
a head portion extending along one of the parallel axes about which the louver is to pivot;
a tail blade extending from the head portion; the tail blade having a front face and a rear face;
fin blades extending from the rear face at spaced locations along the tail blade, each of the fin blades having opposite blade faces extending in respective planes that intersect said one of the parallel axes;
depositing crop material on the plurality of louvers; and
blowing air between the plurality of louvers, between the fin blades of each of the louvers to separate heavier portions of the crop material from lighter portions of the crop material, wherein the heavier portions of the crop material fall between the plurality of louvers and wherein lighter portions of the crop material are carried away by the blown air.

19. The method of claim 18, wherein the pivoting of the plurality of louvers comprises passing the fin blades through slots of an adjacent one of the plurality of louvers.

* * * * *